United States Patent

Mumford

[11] 4,004,905
[45] Jan. 25, 1977

[54] SAFETY LOCK FOR FORMING MACHINE BLOWHEAD

[75] Inventor: Eustace Harold Mumford, Ottawa Lake, Mich.

[73] Assignee: Owens-Illinois, Inc., Toledo, Ohio

[22] Filed: Nov. 21, 1975

[21] Appl. No.: 634,091

[52] U.S. Cl. .................. 65/159; 65/261; 65/266; 65/300; 65/357; 248/407; 248/408; 248/412; 403/324
[51] Int. Cl.² .......................................... C03B 9/14
[58] Field of Search ............ 65/300, 357, 359, 159, 65/261, 266; 248/407, 408, 412; 403/324

[56] References Cited

UNITED STATES PATENTS

| 1,832,080 | 11/1931 | Allen | 65/300 |
|---|---|---|---|
| 2,842,387 | 7/1958 | Della-Porta | 403/324 |
| 3,383,193 | 5/1968 | Bailey | 65/359 |
| 3,506,234 | 4/1970 | Roder et al. | 248/412 |
| 3,642,088 | 2/1972 | Smith | 248/408 X |
| 3,770,236 | 11/1973 | Marsh et al. | 248/408 |

*Primary Examiner*—S. Leon Bashore
*Assistant Examiner*—Frank W. Miga
*Attorney, Agent, or Firm*—D. T. Innis; E. J. Holler

[57] ABSTRACT

An apparatus for forming glass containers wherein the glass is expanded to its final shape in a blow mold. A blowhead is brought onto vertical registry with the blow mold cavity. In the conventional Hartford I.S. forming machine, the mechanism for moving the blowhead onto and out of registry with the blow mold is pneumatically operated. The blowhead and the arm that supports the blowhead or blowheads is of considerable mass, and when an operator is required to change blow molds, or in some instances repair mechanisms which are at the blow mold location, it is necessary to maintain the blowhead in its up position. Air lockout systems have been used in the past but have not been foolproof. Accidents may occur. The present invention utilizes a mechanical lockout arrangement which locks the piston rod in its elevated position to avoid any possibility of the blowhead dropping.

1 Claim, 4 Drawing Figures

SAFETY LOCK FOR FORMING MACHINE BLOWHEAD

BACKGROUND OF THE INVENTION

In the blowhead mechanism of the Hartford I.S. machine, the blowhead support arm is clamped to a vertical, reciprocable piston rod whose lower end carries a cam which rides in a cam slot and whose upper end telescope into an annular support member. Typically, when it is desired to have the blowhead mechanism placed in its "parked" position, it was accomplished by the air operated piston rod being held in position by application of air to the underside of the driving piston. The prior art teaches the use of a safety lock being accomplished by the introduction of safety air into the system through a valve being set. An example of such art is U.S. Pat. No. 2,542,086 issued Feb. 20, 1951.

Another prior art patent, U.S. Pat. No. 1,911,119 issued May 23, 1933, shows in FIG. 4, a pneumatic mechanism for operating a "settle-blow" head 85, funnel 55 as well as a parison blowing head 257. The similarity of these mechanisms is such that they operate in similar manners. Each of these mechanisms have a "parked" position which is at a level above its operational level.

SUMMARY OF THE INVENTON

It is an object of this invention to provide a mechanical lockout arrangement in association with the blowhead operating mechanism of a glass forming machine.

It is a further object of this invention to provide a lockout arrangement for the blowhead mechanism which, when put in use, provides a positive lockout arrangement requiring specific manipulation to free the blowhead supporting mechanism for sub- sequent normal operation.

DETAILED DESCRIPTION OF THE DRAWINGS

Figure 1:
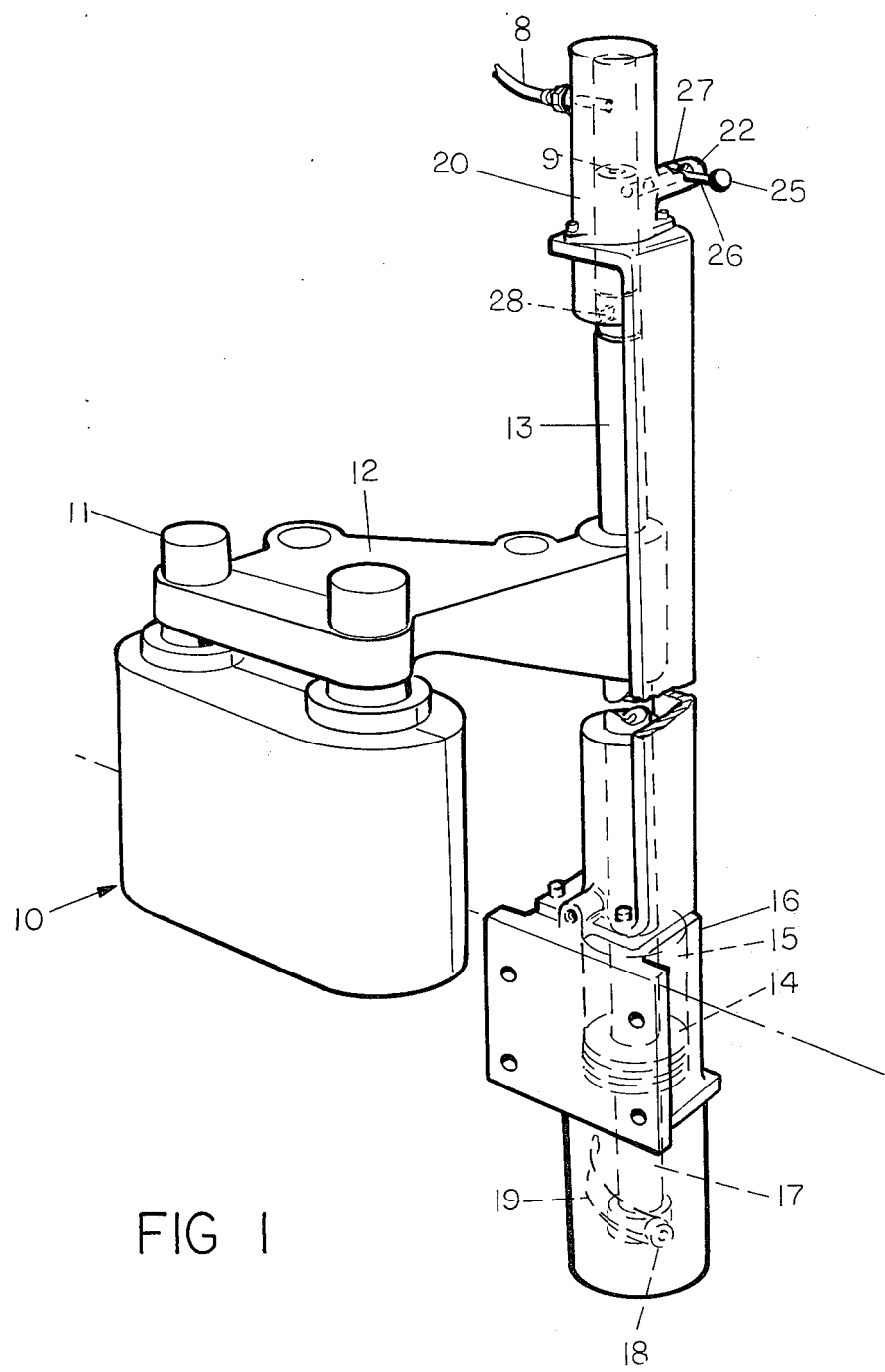
FIG. 1 is a perspective view of the invention in its operational environment.

With particular reference to FIG. 1, the apparatus of the invention will be described in conjunction with the blow molding station depicted. A pair of mold half holders are schematically shown and in closed position form a dual cavity blow mold generally designated 10. On the well-known Hartford I.S. machine, blow molds are situated in the position to receive parisons, with parisons being previously formed and then transferred to the blow molds. The parisons are enclosed within the split blow molds and expanded into final bottle shape by the introduction of air under pressure to the interior thereof, through their upper open necks. The introduction of air under pressure is carried out by the positioning of a pair of blowheads 11 of conventional design. The blowheads are carried by a supporting arm 12 for movement into and out of registry with the cavities of the blow mold 10. The blowheads 11, in normal operation, must be capable of being moved vertically out of contact with the blow mold and be rotated or swung out of the vertical plane of the blow mold so that formed bottles may be grasped by their necks and thereby transferred from the blow molds to a dead plate. To accomplish this, the supporting arm 12 is fixed to a vertical shaft 13 whose lower end is connected to a piston 14. The piston 14 rides in a cylinder 15 formed in a lower housing 16. In actual practice, the housing 16 is clamped to the main support frame (not shown) of the forming machine.

As can be seen in FIG. 1, the shaft 13 has a lower extension 17 from which a follower 18 extends radially. The follower 18 rides in a generally spiral cam track 19 formed in the lower portion of the housing 16. It can thus be seen that vertical reciprocation of the piston 14 will move the shaft 13 vertically upward and at the same time rotate the shaft 13 in a clockwise direction.

As previously stated, it has been the practice in the past that when it was necessary to place the blowhead out of position, that the piston 14 would be maintained in its upward position by trapping or maintaining air under pressure therebeneath. The great danger in this arrangement is that if for any reason the air leaks or if the timing system or lockout is disrupted by a failure of the plant air supply, the head may descend with usually unpleasant results. Furthermore, the blow air itself is fed to the blowheads through an axial bore 9 in the shaft 13. As can be seen in FIG. 1, the upper support 20 is provided with a connection 8, through which air is connected to the bore 9. This arrangement will have a tendency of biasing the shaft in a downward direction if the blow air is accidentally cycled on at a critical time when the operator is working on the blow molds. The upper end of the shaft 13 is guided within the upper support member 20.

Figure 3:
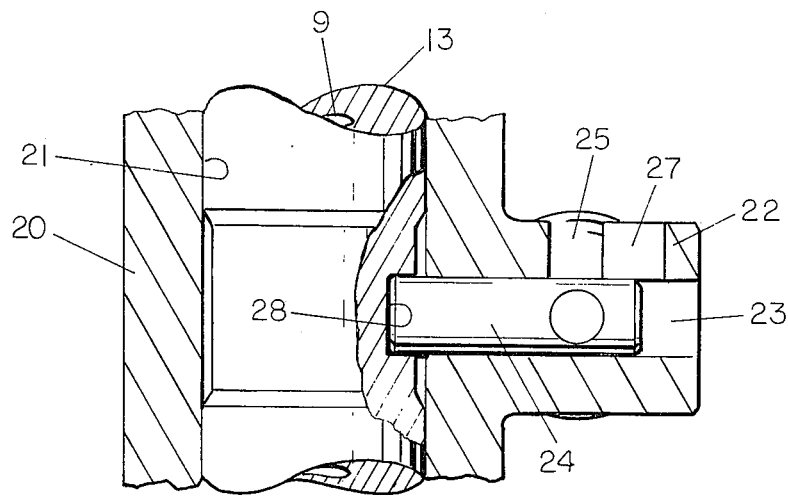
FIG. 3 is a cross-sectional view taken at line 3—3 of FIG. 2.
Figure 2:
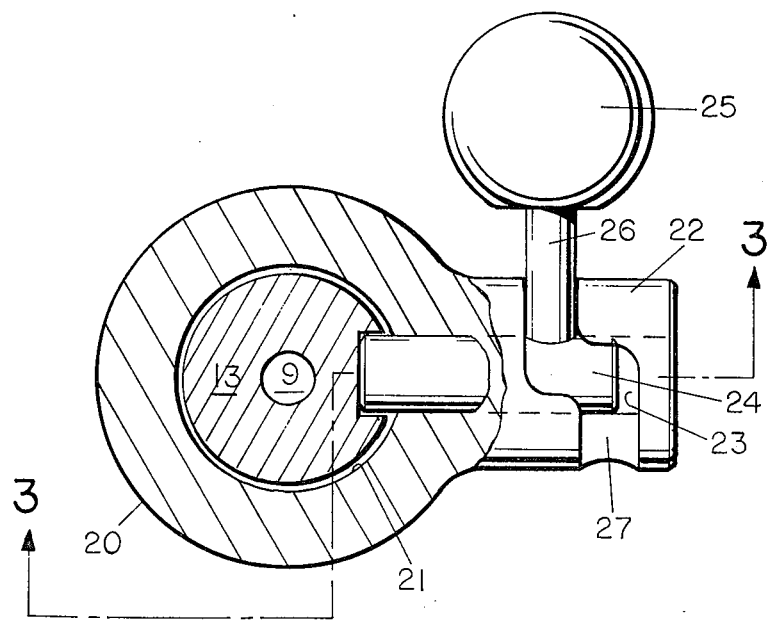
FIG. 2 is a top plan view on an enlarged scale of the lockout system of the invention.

As can best be seen in FIGS. 2 and 3, the upper support member 20 has a bore 21 formed therein into which the shaft 13 telescopes. At one side of the upper support member 20 is a radially extending casting or boss 22 formed thereon having a bore 23 extending axially therethrough and opening into the interior of the bore 21 of the support member 20. The bore or passage 23 carries a lock pin 24 therein, with the pin being axially shiftable relative to the casting 22 by means of a handle 25. The handle 25 is connected to the pin 24 by a rod 26 extending through a slot 27. The slot 27 has a configuration, as best shown in FIG. 2, such that the rod 26 and pin 24 may be to the left, as shown in FIG. 2, or be rotated counter-clockwise so as to place the rod 26 in the other end of the slot 27. With the rod and handle rotated, the pin 24 will, in effect, be retracted from the bore 21 of the supporting member 20.

As can best be seen in FIG. 3, the shaft 13 is provided with a recess 28 within which the end of the pin or bolt 24 is adapted to extend when the shaft 13 is in its uppermost position and consequently rotated clockwise, as viewed in FIG. 1. With the bolt or pin 24 positioned as shown in FIGS. 2 and 3, the shaft 13 is physically locked against downward movement, regardless of the air supply or malfunction of any other automatic means presently provided on the forming machines for maintaining the blowhead in its elevated position. With the particular safety lock of the invention, once the operator moves the handle through 180° in a clockwise direction, the bolt will seat within the recess formed in the shaft and safely lock the blowhead in elevated "parked" position. It will then be necessary that the operator retract the pin before the blowhead may be put back in operation.

Figure 4:
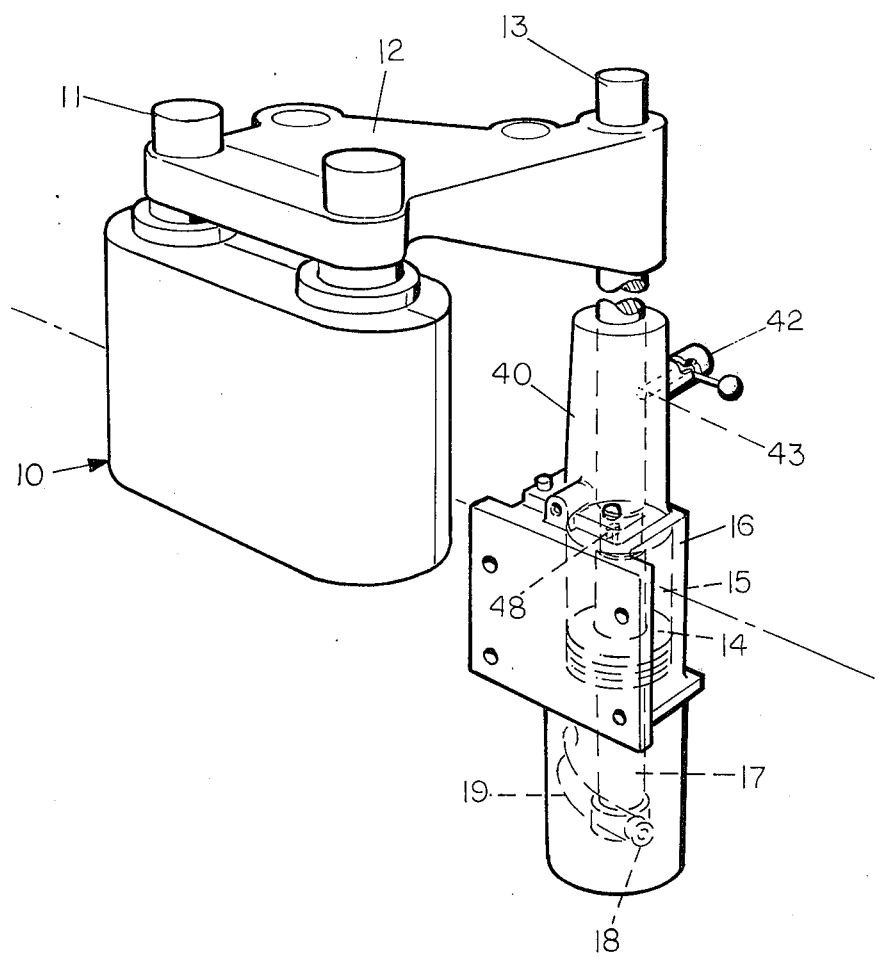
FIG. 4 is a perspective view of the invention in an alternative location.

With particular reference to FIG. 4, an alternative location for the safety lock of the invention is shown. As can be seen from the arrangements shown in FIG. 4 of U.S. Pat. No 1,911,119, cited above, the pneumatically operated mechanisms which involve the vertical reciprocation of a shaft are not provided with an upper support member into which the upper end of the shaft is telescoped. In conjunction with such a design, the invention has application to the mechanism in the manner shown in FIG. 4 wherein a boss 42 is provided on the lower sleeve-bearing guide 40. The shaft 13 will have an appropriate recess 48 formed therein in position such that, in elevated position, it will be in alignment with the pin or bolt 24 carried in the axial opening 43 in the boss 42. It should be clear that the lockout mechanism will function in the same manner as described in detail with respect to FIGS. 1–3.

I Claim:

1. In apparatus for forming glass containers wherein the glass is formed into shape in a mold by a blowing head mechanism, the improvement in said blowing head comprising:

a vertically positioned, stationary, pneumatic piston-cylinder motor;

a rod connected to said piston and extending vertically upward from said stationary pneumatic motor;

a stationary support member above said motor, said support member having a generally vertical bore there-through;

said piston rod having a portion thereof extending within the bore of said stationary support member;

a blowing head arm fixed to said piston rod;

said blowing head arm extending radially from said rod and adapted to carry a relative heavy blowhead on the extending end thereof remote from the piston rod.

a radially extending casting formed on the side of said support member and having a central horizontal bore therein;

a bolt slideable in the bore of said casting;

a single radial opening formed in the side of that portion of the piston rod which registers with the bore in said casting when said rod is in its uppermost position whereby when said bolt is moved forward in said casting, it will enter the opening in said piston rod;

an operating handle extending from the side of said bolt;

said operating handle extending through a slot in said casting;

said slot being generally "Z" shaped so that axial movement of the bolt is controlled by the position of the handle thereof to two extreme portions of said slot, wherein in one position the bolt is fully retracted relative to said piston rod and in the other position the bolt will be extending into the radial opening in the piston rod to thereby physically lock the blowing head at its highest elevation.

* * * * *